Oct. 26, 1937.  O. W. SJOGREN ET AL  2,097,244
ANTIFRICTION BEARING FOR DISK HARROWS
Filed Aug. 15, 1936   2 Sheets—Sheet 1
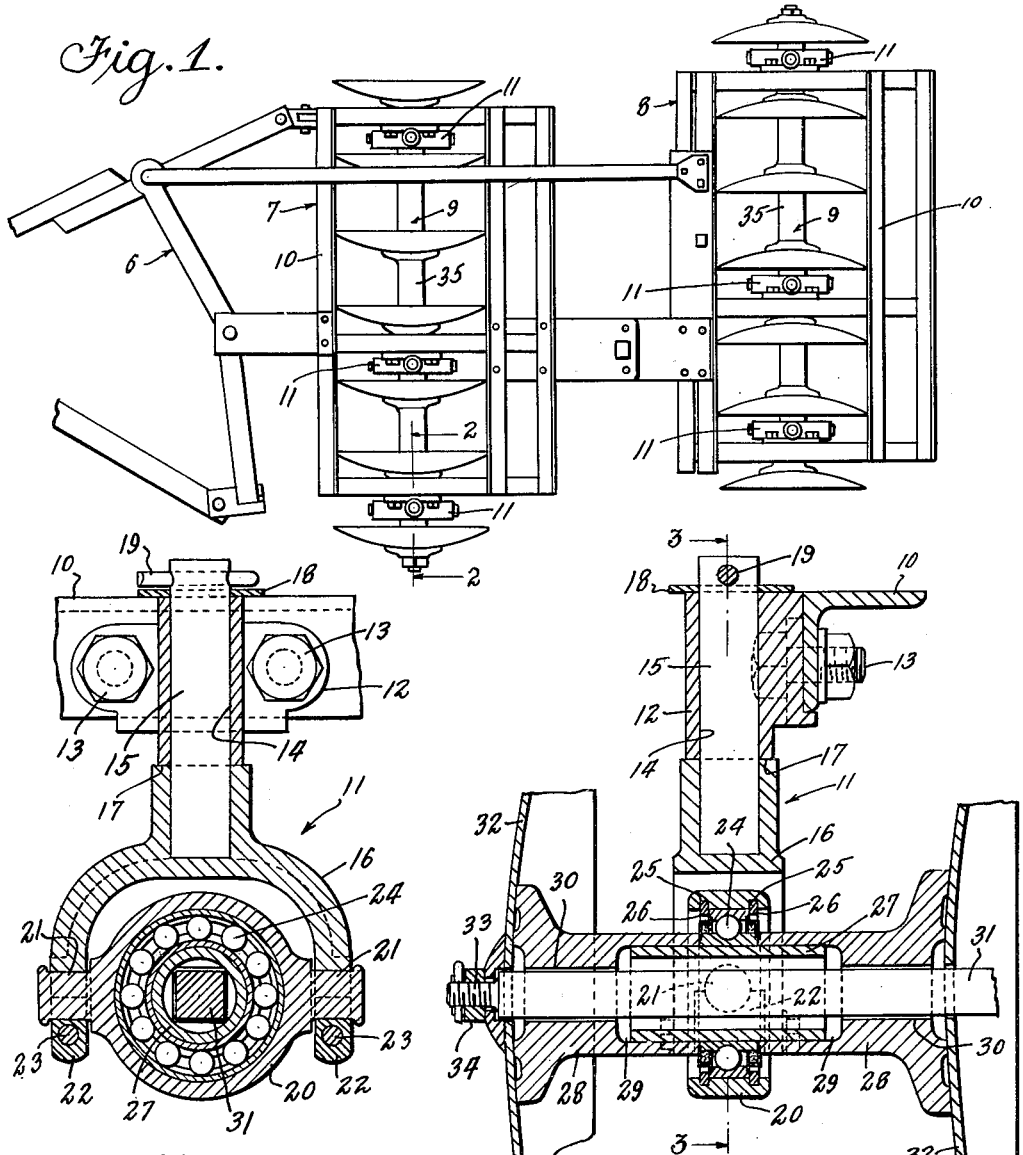
INVENTORS
Oscar W. Sjogren
Rollie H. Mitchell
BY Lyon & Lyon
ATTORNEYS Patented Oct. 26, 1937

2,097,244

UNITED STATES PATENT OFFICE 2,097,244

ANTIFRICTION BEARING FOR DISK HARROWS

Oscar W. Sjogren and Rollie H. Mitchell, Huntington Park, Calif., assignors, by mesne assignments, to Killefer Manufacturing Corporation, a corporation of California Application August 15, 1936, Serial No. 96,218

2 Claims. (Cl. 97—220)

This invention relates to anti-friction bearings for disk harrows and especially to the manner in which the anti-friction bearings are mounted upon the frame of the harrow.

It is one of the principal objects of this invention to provide a simple, effective, self-aligning means for mounting the disk gangs upon antifriction bearings.

A further object is to provide a mounting means for a standard commercial form of sealed antifriction bearing, which bearings are provided with felt washers held in suitable retainers assembled as a unit with the bearings to maintain the lubricant within the bearings and to prevent deleterious matter from working its way into said bearings.

A further object is to provide an anti-friction bearing mounting for a disk harrow which will prevent the bearings from binding due to a bent axle or to bending of the axle during operation.

A further object is to provide a harrow with anti-friction bearings whereby the disk will rotate more easily under load and which disks will have no tendency to drag or stop rotating and as a result a more perfect job of harrow will be performed and less tractive force will be required to pull the harrow thereby resulting in a material saving of tractor fuel.

A further object is to provide a disk harrow with anti-friction bearings which will not need to be lubricated during the life of the bearings.

Other objects and advantages of the invention will become apparent as the nature of the same is more fully understood from the following description and accompanying drawings wherein is set forth what is now considered to be a preferred embodiment. It should be understood, however, that this particular embodiment of the invention is chosen principally for the purpose of exemplification and that variations therefrom in details of construction or arrangement of parts may accordingly be effected and yet remain within the spirit and scope of the invention as the same is set forth in the appended claims.

In the drawings,

Figure 1 illustrates a top plan view of a disk harrow equipped with the anti-friction bearing mountings of this invention.

Figure 2 illustrates an enlarged fragmental sectional view taken substantially in the plane of line 2—2 of Fig. 1.

Figure 3 illustrates a sectional view taken substantially in the plane of line 3—3 of Fig. 2.

Figure 4:
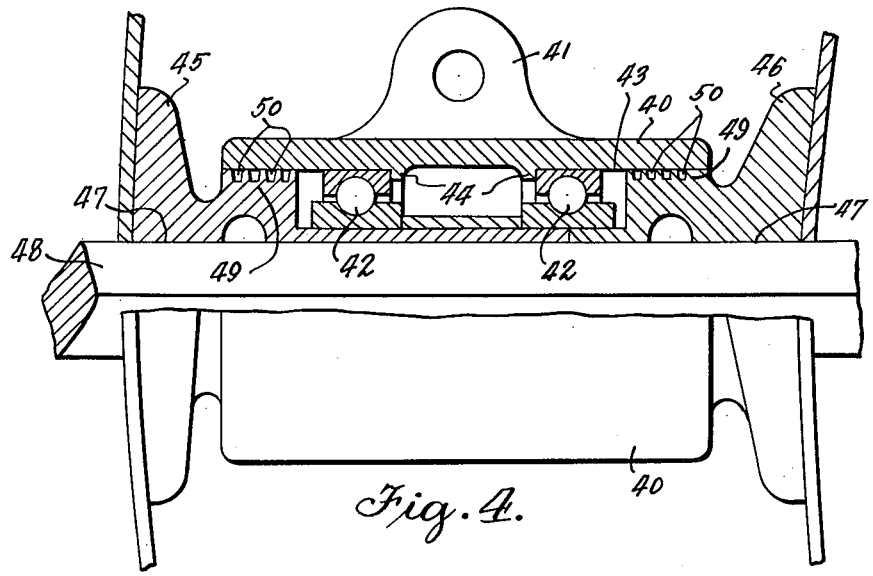
Figure 4 illustrates, partially in section, a modified form of mounting means.

It will be understood the bearing mounting forming the subject matter of this invention may be applied to any form of harrow. For the purpose of illustration and description, the invention has been applied to a single tandem disk harrow as shown in Figure 1. This harrow includes a hitch means partially shown at 6, a front gang 7, a rear gang 8, and suitable coupling means between the gangs and hitch. Each gang is provided with a set of harrow disks 9 journaled to the gang frame 10 by the anti-friction gimbal bearing mounting means 11 forming the subject matter of this invention. As the construction of the bearing mounting means 11 is the same for each, the description of one will do for all.

The preferred form of bearing mounting means 11 is most clearly shown in Figures 2 and 3, and includes a bearing block 12 securely fastened to the gang frame 10 as by bolt means 13. The bearing block is provided with a vertical bearing bore 14.

Journally mounted in the bearing bore 14 is shaft 15 of bearing yoke 16. The shaft is maintained in proper relation with bearing 12 by means of the yoke shoulder 17 at its lower end and washer 18 and cotter pin 19 at its upper end. By this arrangement the yoke may swing freely about a vertical axis but is held against longitudinal movement relative to the harrow frame. As may be observed in Figure 3, a trunnion 20 is journaled to the yoke. The trunnion is journaled to the yoke by bearings 21 which are formed so that the lower half 22 of the bearing may be removed in order to mount or dismount the trunnion on the yoke. The bearing blocks 22 are preferably secured to the lower ends of the yoke arms by screw means 23.

The trunnion is bored to receive the outer race of an anti-friction bearing 24 and is of sufficient width to provide a retaining groove 25 adjacent each side of the race. A bearing retainer ring 26 is placed in each groove to thereby securely key the anti-friction bearing to the trunnion. It will be understood that rings 26 are split rings in order that they may be contracted sufficiently to permit their being snapped into or removed from the retaining grooves as is customary in this type of construction.

The anti-friction bearing is preferably of the standard sealed type for retaining the lubricant within the bearing and excluding deleterious matter therefrom and, therefore, special bearing enclosing means are unnecessary.

A cylindrical sleeve 27 is mounted within the bore of the inner race of bearing 24 and extends beyond each side thereof to support the harrow disk spacers 28 which are counterbored as at 29 to receive the ends of the sleeve. The spacers have square bores 30 through which the square axle 31 extends and are arranged for properly spacing the harrow disks 32 along the axle in the usual manner. Each end of the axle is threaded as at 33 to receive a threaded nut 34 by means of which the spacers and disk are tightly clamped upon the axle. Due to this clamping effect the counterbored ends of spacers 28 tightly clamp between them the inner race of bearing 24.

It will be understood that the spacers 28 at the location of the bearings are counterbored to support the bearing sleeve and that the other spacers 35 (Fig. 1) may be formed of a single unit and not counterbored.

The mounting for the anti-friction bearing 24 permits the bearing to be fully self-aligning in case the shaft is bent or bends under load and, therefore, a destructive binding force cannot be applied to the bearing and, as a result of the disk, will at all times turn freely, which is a very important feature. Consequently, the harrowing is more perfectly performed. Also the power required to pull the harrow is greatly reduced.

In the operation of a harrow equipped with our invention a tractor or other source of motive power will be coupled to hitch 6 and the harrow then operated in its usual manner. The operator will find, due to the anti-friction bearings, that the gangs will go into angle and return from angled relation much more readily and that the disk will always turn freely and that, due to the self-aligning feature, the bearings will have a very much longer life and slight bending of the axle under heavy load will not cause the gangs to stop rotating. Due to the freeness with which the disk gangs rotate, very much less power will be required to pull the harrow and a more perfect operation of the machine will result.

In Figure 4 we have shown a modified form of anti-friction bearing. In this figure a bearing housing 40 is provided with a cylindrical bearing receiving bore 43 and a bracket 41 by means of which the housing may be mounted upon the harrow frame. A pair of anti-friction bearings 42 are fitted into bore 43 of the housing until they engage spaced annular flanges 44. One or both of the disk spacers 45 and 46 may have a cylindrical portion closely fitting the bore of the inner race of the anti-friction bearings and with square holes 47 for the square axle 48 to pass through. The spacers may be provided with cylindrical portions 49 of enlarged diameter to form with bore 43 a dust seal having its purpose to maintain the lubricant within the bearing housing and dust, water and dirt therefrom. The portions 49 may be provided with annular grooves 50 to assist in forming a seal with the bore.

Figure 5:
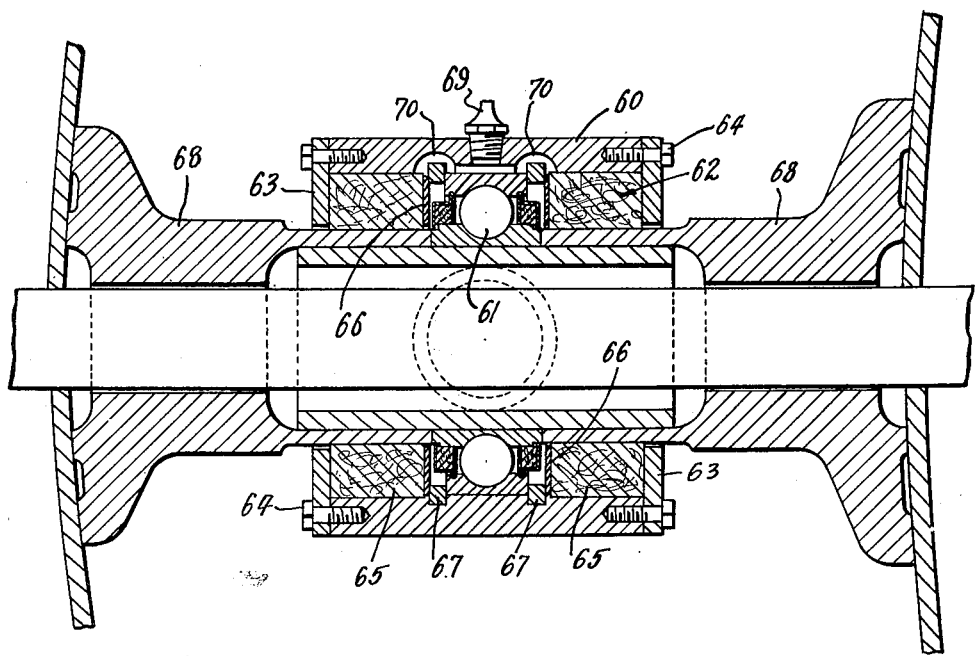
Figure 5 illustrates a further modification of the invention.

The modified form of the invention as shown in Figure 5 closely follows the design of the preferred form. In this form the trunnion 60 is made of greater width to provide upon each side of the anti-friction bearing 61 a packing box 62 for the purpose of safeguarding the bearing from dirt, water, or other deleterious matter.

To each end of the trunnion are fastened annular plates 63 by means of screws 64 for retaining the packing material 65 within the trunnion. Annular plates 66 are mounted within the trunnion and are forced by the packing into contact with split rings 67 which maintain the bearing in its proper operative position as explained for the preferred form.

As may be observed in this figure, packing 65 is confined within the trunnion by the annular plates 63 and 66 and acts against the inner bore of the trunnion and the peripheral surface of the spacers 68, to thereby effectively seal the inner portion of the trunnion against the intrusion of destructive matter. This sealing means is in addition to the sealing means included as part of the anti-friction bearing.

Means are provided for admitting oil or grease to the inner ends of each of said packing boxes for the purpose of assisting in forming a perfect seal and also for forcing out any foreign matter which may have worked into the packing.

This means includes a standard form of valved fitting 69 screw threaded into the trunnion and communicating the fitting with each end of the packing boxes by passages 70. By forcing high pressure grease or oil through the fitting, the oil or grease will flow to the packing and thence between the packing and spacers 68 to the exterior of the trunnion, thereby washing the boxes clean and at the same time supplying the device with an ample supply of clean lubricant. In other respects the structure is like that set forth for the preferred form.

Having fully described a preferred embodiment of the invention, it is to be understood that it is not to be limited to the details herein set forth but the invention is for the full scope of the appended claims.

We claim:

1. In an anti-friction bearing mounting for a disk harrow, a harrow frame, yoke means vertically journaled to said frame, a trunnion member horizontally journaled to said yoke, sealed anti-friction bearing means carried by said trunnion, a sleeve carried by said bearing, a pair of harrow disk spacers counterbored to receive said sleeve and to clamp the inner race of said anti-friction bearing therebetween, and a harrow disk carrying shaft carried by the spacers and arranged to clamp the said spacers tightly against said anti-friction bearing inner race.

2. In an anti-friction bearing mounting for a disk harrow, a harrow frame, sealed anti-friction bearing means, gimbal bearing means for universally mounting said anti-friction bearing to said frame, a sleeve carried by said bearing, a pair of harrow disk spacers counterbored to receive said sleeve, and a harrow disk carrying shaft carried by the spacers and arranged to clamp the said spacers tightly against the inner race of said anti-friction bearing.

OSCAR W. SJOGREN.
ROLLIE H. MITCHELL.